(12) United States Patent
Ferri et al.

(10) Patent No.: US 9,995,592 B2
(45) Date of Patent: Jun. 12, 2018

(54) DEVICE AND METHOD FOR CALIBRATING AN ALTITUDE MEASUREMENT DEVICE

(71) Applicant: The Swatch Group Research and Development Ltd, Marin (CH)

(72) Inventors: Yvan Ferri, Lausanne (CH); Nicolas Rebeaud, Saubraz (CH)

(73) Assignee: The Swatch Group Research and Development Ltd, Marin (CH)

( * ) Notice: Subject to any disclaimer, the term of this patent is extended or adjusted under 35 U.S.C. 154(b) by 168 days.

(21) Appl. No.: 15/197,915

(22) Filed: Jun. 30, 2016

(65) Prior Publication Data
US 2017/0059355 A1    Mar. 2, 2017

(30) Foreign Application Priority Data
Aug. 25, 2015  (EP) .................................... 15182362

(51) Int. Cl.
*G01C 25/00* (2006.01)
*G01C 5/06* (2006.01)
(Continued)

(52) U.S. Cl.
CPC ............... *G01C 25/00* (2013.01); *G01C 5/06* (2013.01); *G01L 7/104* (2013.01); *G01L 7/14* (2013.01);
(Continued)

(58) Field of Classification Search
CPC ..... B63C 2011/021; G01C 25/00; G01C 5/06; G01L 7/104; G01L 7/14; G01L 27/005;
(Continued)

(56) References Cited

U.S. PATENT DOCUMENTS 3,874,242 A * 4/1975 Csaposs .................. G01L 7/104
                                                   73/386
4,077,257 A   3/1978 Leemann
                  (Continued)

FOREIGN PATENT DOCUMENTS

EP     0 011 681 A1    6/1980
EP     0 633 458 A1    1/1995
           (Continued)

OTHER PUBLICATIONS

European Search Report dated Mar. 7, 2016 in European Application 15182362, filed Aug. 25, 2015 (with English Translation and Written Opinion).

*Primary Examiner* — David A Rogers
(74) *Attorney, Agent, or Firm* — Oblon, McClelland, Maier & Neustadt, L.L.P.

(57) ABSTRACT

Sealed device for calibrating an altitude measurement device comprising an atmospheric pressure sensor whose movements of deformation are converted, via a transmission system, into a pivoting motion of an activation system that drives the pivoting of an indicator hand, wherein a sensing element bearing on the atmospheric pressure sensor is rigidly fixed to a transmission shaft movable along its longitudinal axis of symmetry, wherein the calibration device includes an air intake that can adjust the pressure inside the calibration device as required, and also includes a first button via which the axial position of the transmission shaft can be adjusted, and a second button via which it is possible to move the atmospheric pressure sensor up or down.

The invention also concerns a method for calibrating the altitude measurement device using the sealed calibration device.

7 Claims, 11 Drawing Sheets

(51) Int. Cl.
*G01L 7/10* (2006.01)
*G01L 7/14* (2006.01)
*G01L 27/00* (2006.01)
*G04B 47/06* (2006.01)

(52) U.S. Cl.
CPC .......... *G01L 27/005* (2013.01); *G04B 47/066* (2013.01)

(58) Field of Classification Search
CPC ...... G04B 47/066; G04B 47/06; G04G 21/02; G04G 9/0064
See application file for complete search history.

(56) References Cited

U.S. PATENT DOCUMENTS

| | | | |
|---|---|---|---|
| 4,238,958 A | 12/1980 | Dostmann | |
| 4,783,772 A * | 11/1988 | Umemoto | B63C 11/02 368/11 |
| 5,317,921 A * | 6/1994 | Kremidas | G01L 19/0038 338/4 |
| 5,357,488 A * | 10/1994 | Udo | G04B 47/068 368/11 |
| 5,533,414 A * | 7/1996 | Huang | G01L 19/10 116/271 |
| 5,592,442 A * | 1/1997 | Nishikawa | G04G 21/02 368/11 |
| 5,724,317 A * | 3/1998 | Kubota | G01D 13/24 368/10 |
| 5,773,732 A | 6/1998 | Rutten et al. | |
| 6,754,137 B1 * | 6/2004 | Bourquin | G04C 17/0091 368/10 |
| 7,123,549 B2 * | 10/2006 | Robert | G04G 21/02 368/11 |
| 7,509,848 B2 * | 3/2009 | Chen | G01L 19/12 73/146 |
| 7,623,415 B2 * | 11/2009 | Raeber | B63C 11/32 368/10 |
| 7,778,115 B2 * | 8/2010 | Ruchonnet | G01L 7/163 368/101 |
| 7,821,878 B2 * | 10/2010 | Plancon | G04B 19/082 368/223 |
| D708,077 S * | 7/2014 | Mille | D10/31 |
| 2004/0160859 A1 * | 8/2004 | Germiquet | G04C 17/0091 368/14 |
| 2015/0101412 A1 * | 4/2015 | Poli | G04G 21/02 73/714 |

FOREIGN PATENT DOCUMENTS

| | | |
|---|---|---|
| EP | 2 799 829 A1 | 11/2014 |
| FR | 2 343 998 A1 | 10/1977 |

* cited by examiner

DEVICE AND METHOD FOR CALIBRATING AN ALTITUDE MEASUREMENT DEVICE

This application claims priority from European Patent Application No 15182362.2 filed Aug. 25, 2015, the entire disclosure of which is hereby incorporated herein by reference.

FIELD OF THE INVENTION

The present invention concerns a device and a method for calibrating an altitude measurement device. More specifically, the present invention concerns a calibration device and method which can quickly calibrate an altitude measurement device in a simple, reproducible manner.

BACKGROUND OF THE INVENTION

Many altitude measurement devices are known, including skydiving altimeters whose sensing element is an aneroid pressure gauge. Such altimeters typically include a dial whose hour circle is graduated from 0 to 4000 meters altitude. An analysis made by the Applicant of several commercially purchased altimeters revealed a hysteresis. This error of linearity was evidenced by calculating the work of friction forces in the mechanism of such altimeters. The mechanism was therefore set on the descent since the absolute altitude measurement error is lower as altitude decreases. These altimeters were set between 0 and 3000 meters altitude as it had been observed that the measurement error increased above 3000 meters altitude. Thus, the maximum error between 0 and 3000 meters altitude reached 21 meters for one of the altimeters, and 34 meters for another altimeter. It is therefore seen that the skydiving altimeters that were analysed have an error of linearity which leads to a measurement inaccuracy on the order of 1%. Further, given the dispersion of characteristics of aneroid capsules and the manufacturing tolerances with which such altimeters are devised, prior calibration is required. In the case of altimeters of the aforementioned type, this calibration is quite tedious. It is performed manually by a person specially trained for this task and consists in reading the value displayed by the altimeter successively at a pressure equivalent to sea-level pressure, then, for example, at a pressure equivalent to that at 4000 meters altitude, and then again at a pressure equivalent to that at 0 m and so on. Each time, the mechanism is adjusted so that the altitude displayed corresponds to the ambient pressure value. Performing such successive iterations gradually reduces the altimeter measurement error.

SUMMARY OF THE INVENTION

It is an object of the present invention to overcome the aforementioned problems in addition to others, by providing an accurate altitude measurement device having the lowest possible hysteresis.

To this end, the present invention concerns a sealed calibration device for an altitude measurement device, the altitude measurement device including an atmospheric pressure sensor arranged to be compressed or to expand in a rectilinear direction as a function of the atmospheric pressure to be measured which increases or decreases, the movements of deformation of the atmospheric pressure sensor being converted, via a transmission system, into a pivoting motion, in a plane perpendicular to the rectilinear direction of deformation of the atmospheric pressure sensor, of an activation system which drives the pivoting of an indicator hand, this indicator hand moving opposite a graduated circular scale, the atmospheric pressure sensor being mounted on a seat which is fixed in a support, the support being provided on the external periphery thereof with a first thread which cooperates with a second thread provided on the inner periphery of a cover, the transmission system including a sensing element formed of an arm, via a free end of which the sensing element bears on the atmospheric pressure sensor, the sensing element being rigidly fixed to a transmission shaft which extends in a perpendicular direction to the rectilinear direction of deformation of the atmospheric pressure sensor, the transmission shaft being movably mounted along its longitudinal axis of symmetry between an adjustment screw and a resilient strip, the sealed calibration device being characterized in that it comprises an air intake which can adjust the pressure inside the calibration device as required, the calibration device also including first and second buttons for setting the altitude measurement device, the first button being extended towards the inside of the sealed chamber by a screwdriver blade which makes it possible to activate the adjustment screw to adjust the axial position of the transmission shaft, and the second button comprising a shaft which, at the free end thereof, carries a pinion which cooperates with a toothed wheel which extends horizontally and whose plate carries two pins which are received in two corresponding holes provided in the support, so that by activating the second button in one direction or the other, it is possible to screw-in or unscrew the support and to move the atmospheric pressure sensor up or down.

According to a complementary feature of the invention, a sealing gasket is engaged on the screwdriver blade in order to seal the passage of the first button, and a sealing gasket is engaged on the shaft in order to seal the passage of the second button.

The sealed calibration device is of the type having a chamber closed by a glass with the insertion of a sealing gasket.

As a result of these features, the present invention provides a calibration device for an altitude measurement device in which calibration operations are considerably simplified and may be automated if desired. This remarkable result is achieved as a result of the fact that two setting operations, one performed at an atmospheric pressure equivalent to sea-level pressure, and the other, for example, at a pressure corresponding to 4000 meters altitude, are sufficient to calibrate the altitude measurement device according to the invention. Further, the setting operations consist simply, for the two selected altitudes, in placing the line of contact points between the transmission pin and the rack parallel to the transmission shaft, and then adjusting the position of the atmospheric pressure sensor relative to the other altitude measurement device components, which can be very easily visually checked even by an inexperienced operator, or by a camera. The accuracy with which it is possible to perform calibration makes it possible to obtain an altitude measurement device exhibiting low or zero hysteresis, which allows the indicator hand to move linearly and thus, where necessary, to make more than one revolution of the dial and thereby be able to accurately measure higher altitudes.

The invention also concerns a method for calibrating an altitude measurement device, the altitude measurement device including an atmospheric pressure sensor arranged to be compressed or to expand in a rectilinear direction as a function of the atmospheric pressure to be measured which increases or decreases, the movements of deformation of the atmospheric pressure sensor being converted, via a transmission system, into a pivoting motion, in a plane perpendicular to the rectilinear direction of deformation of the atmospheric pressure sensor, of an activation system which drives the pivoting of an indicator hand, this indicator hand moving opposite a graduated circular scale, the atmospheric pressure sensor being mounted on a seat which is fixed in a support, the support being provided on the external periphery thereof with a first thread which cooperates with a second thread provided on the inner periphery of a back cover, the transmission system including a sensing element formed of an arm, via a free end of which the sensing element bears on the atmospheric pressure sensor, the sensing element being rigidly fixed to a transmission shaft which extends in a perpendicular direction to the rectilinear direction of deformation of the atmospheric pressure sensor, the transmission shaft being movably mounted along its longitudinal axis of symmetry between an adjustment screw and a resilient strip, a transmission pin rigidly fixed to the transmission shaft cooperating with the activation system in a rectilinear segment of contact points to communicate to the activation system the movements of deformation of the atmospheric pressure sensor, the calibration method being characterized in that it includes the steps which consist in placing the altitude measurement system under an atmospheric pressure of 1013.25 hPa and in acting on the transmission system so as to place the rectilinear segment of contact points parallel to the transmission shaft, then in reducing the atmospheric pressure to a selected value corresponding to a determined altitude and in adjusting the position of the atmospheric pressure sensor so as to place the indicator hand opposite the altitude value on the graduated circular scale that corresponds to the selected atmospheric pressure value.

BRIEF DESCRIPTION OF THE DRAWINGS

Other features and advantages of the present invention will appear more clearly from the following detailed description of an embodiment of a calibration device according to the invention for an altitude measurement device, this example being given solely by way of non-limiting illustration with reference to the annexed drawing, in which.

DETAILED DESCRIPTION OF ONE EMBODIMENT OF THE INVENTION

The present invention proceeds from the general inventive idea that consists in providing a device and a method for calibrating an altitude measurement device which can quickly, simply and accurately calibrate such an altitude measurement device. To this end, the present invention provides a device and a method for calibrating an altitude measurement device which can achieve this result by means of only two measurements, one made at an atmospheric pressure corresponding to sea-level and the other at a lower atmospheric pressure corresponding to a given altitude.

Designated as a whole by the general reference numeral 1, the altitude measurement device includes an atmospheric pressure sensor 2 arranged to be geometrically deformed in a rectilinear direction under the effect of an atmospheric pressure fluctuation to be measured.

Figure 1:
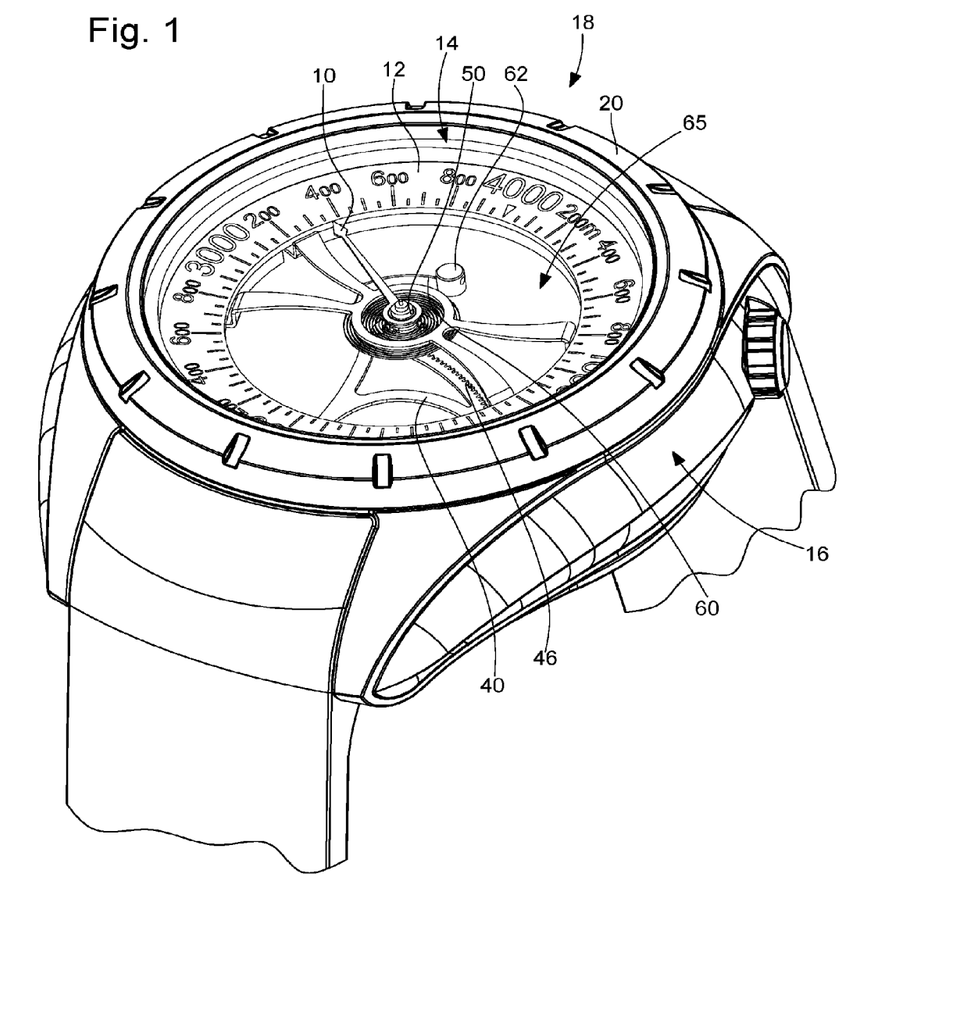
FIG. 1 is a perspective view of a wristwatch case inside which is housed an altitude measurement device.
Figure 2:
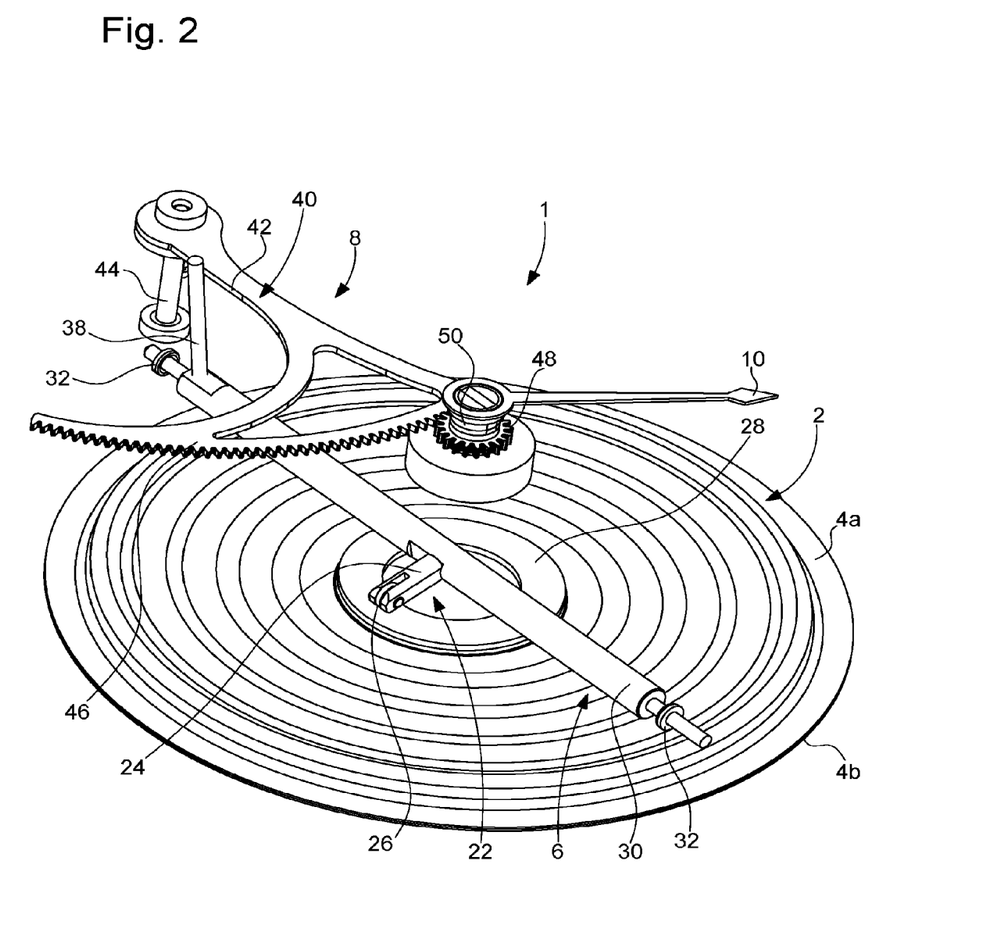
FIG. 2 is a perspective view of the altitude measurement device.

As is shown particularly clearly in FIG. 2, atmospheric pressure sensor 2 is preferably an aneroid pressure gauge. This is a flat, round, usually metallic box, formed of two thin corrugated plates, upper plate 4a and lower plate 4b, assembled to each other by welding. This case is watertight since it has been sealed under partial vacuum. Atmospheric pressure sensor 2 is compressed or expands as a function of atmospheric pressure variations, which causes the two upper and lower plates 4a, 4b to move closer together or further apart from each other. The movements of deformation of atmospheric pressure sensor 2 are converted, via a transmission system 6, into a pivoting motion, in a plane perpendicular to the rectilinear direction of deformation of atmospheric pressure sensor 2, of an activation system 8 which drives the pivoting of an indicator hand 10. As seen in FIG. 1, indicator hand 10 moves opposite a circular scale 12 provided on a flange 14 and graduated, for example, between 0 and 4000 meters in steps of 50 meters. Flange 14 is housed in a case 16 of a wristwatch 18 and can be pivoted by the user by means of a rotating bezel 20. It will be noted that, in the example shown in the drawing, atmospheric pressure sensor 2 is deformed in a vertical rectilinear direction.

Transmission system 6 includes a sensing element 22 formed of an arm 24, which, preferably but not exclusively, is provided at its free end with a caster 26 via which sensing element 22 is in contact with upper plate 4a of atmospheric pressure sensor 2. A washer 28, on which caster 26 bears, is fixed to upper plate 4a of atmospheric pressure sensor 2. The purpose of washer 28 and caster 26 is to minimise as much as possible the friction forces between sensing element 22 and atmospheric pressure sensor 2 and thus to improve the accuracy of altitude measurement device 1.

Sensing element 22 is rigidly fixed to a transmission shaft 30, which extends in a perpendicular direction to the rectilinear direction of deformation of atmospheric pressure sensor 2. In the example shown in the drawing, transmission shaft 30 thus extends horizontally.

Figure 3:
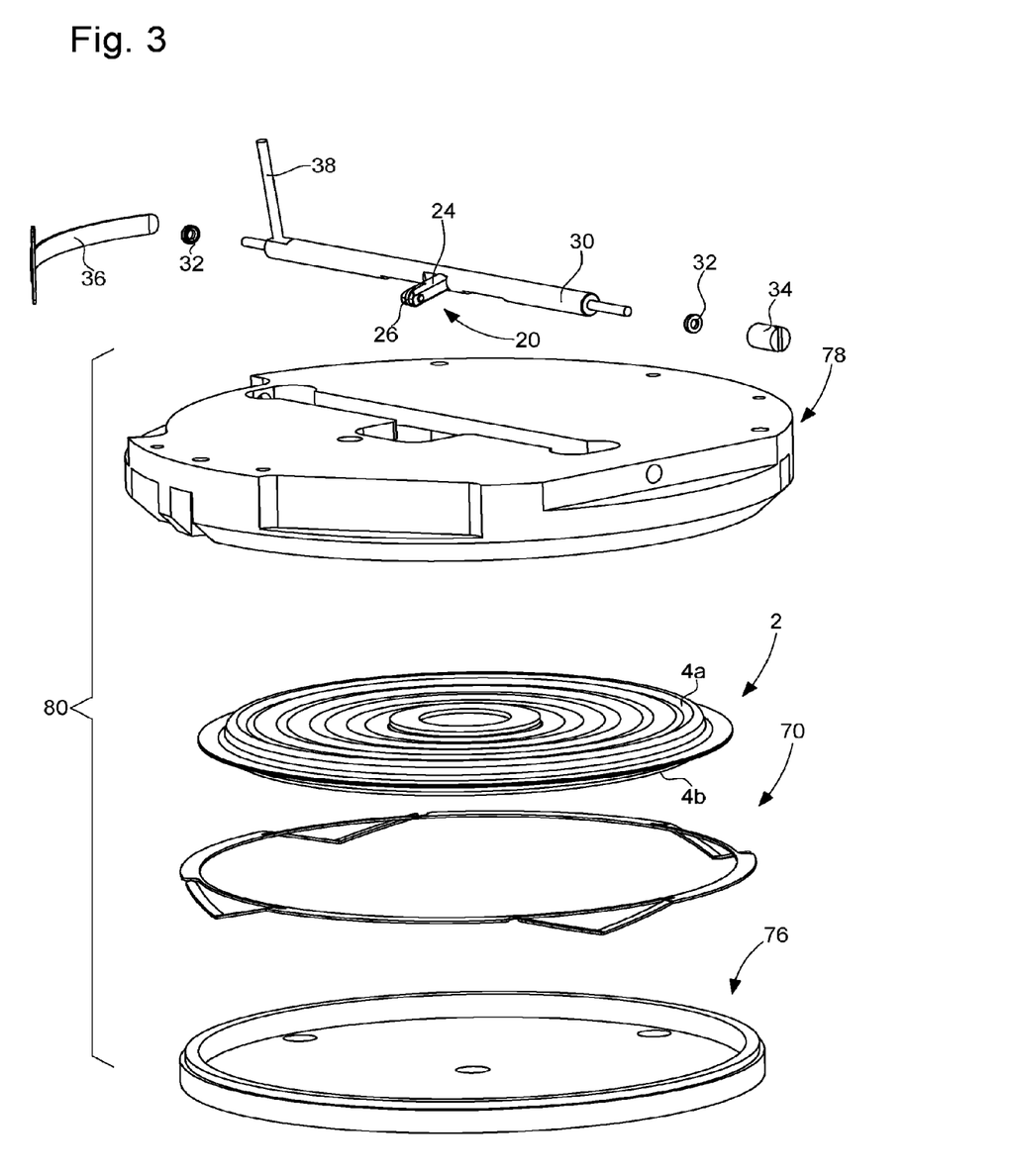
FIG. 3 is an exploded perspective view of a case formed of a cover and of a support and inside which is housed the altitude measurement device.

Transmission shaft 30, whose ends are provided with jewels 32, is arranged to pivot under the effect of the movements of deformation of atmospheric pressure sensor 2 which are transmitted thereto by sensing element 22. It is also to be noted that transmission shaft 30 is mounted to move axially with no play between an adjustment screw 34 and a resilient strip 36 (FIG. 3). Through action on adjustment screw 34, it is thus possible to adjust the longitudinal position of transmission shaft 30.

According to yet another feature, a transmission pin 38, rigidly fixed to transmission shaft 30, communicates to activation system 8 the movements of deformation of atmospheric pressure sensor 2.

More specifically, activation system 8 includes a rack 40 against which transmission pin 38 bears in a rectilinear segment 42 of contact points. As will be seen below, this rectilinear segment 42 serves as a reference mark during the calibration of altitude measurement device 1. Indeed, altitude measurement device 1 is properly set for sea level altitude when rectilinear segment 42 of contact points extends parallel to transmission shaft 30. The axial position of transmission shaft 30 is adjusted to achieve this.

Rack 40 is mounted to pivot in a horizontal plane about a vertical pivot shaft 44. Rack 40 is provided with an arcuate toothed sector 46 which meshes with a pinion 48 integral with a tube 50 on which indicator hand 10 is mounted. Tube 50 can be pivoted on the hour-wheel of the timepiece movement. However, in that case, friction forces which may distort the measurement may be observed. This is why it is preferable for the canon-pinion to pass inside tube 50 without any contact between the canon-pinion and tube 50.

According to yet another feature, altitude measurement device 1 includes elastic means arranged to maintain sensing element 22 in permanent contact with atmospheric pressure sensor 2.

According to a first variant (FIG. 5), the elastic means include a helical spring 52 fixed at a first end to a stud 54 and at another end to rack 40 on which it exerts an elastic return force. This elastic return force is transmitted to sensing element 22 via transmission pin 38 and transmission shaft 30.

According to a second variant (FIG. 6), the elastic means include a spiral spring 56 having an inner curve 58 which is fixed to tube 50 on which indicator hand 10 is mounted, and an outer curve 60 which is fixed to a stud 62 integral with case 16 of wristwatch 18. Preferably but not necessarily, tube 50 on which indicator hand 10 is mounted, is fixed to the inside of a ball bearing 64 which is in turn fixed to a dial 65 of wristwatch 18.

Figure 5:
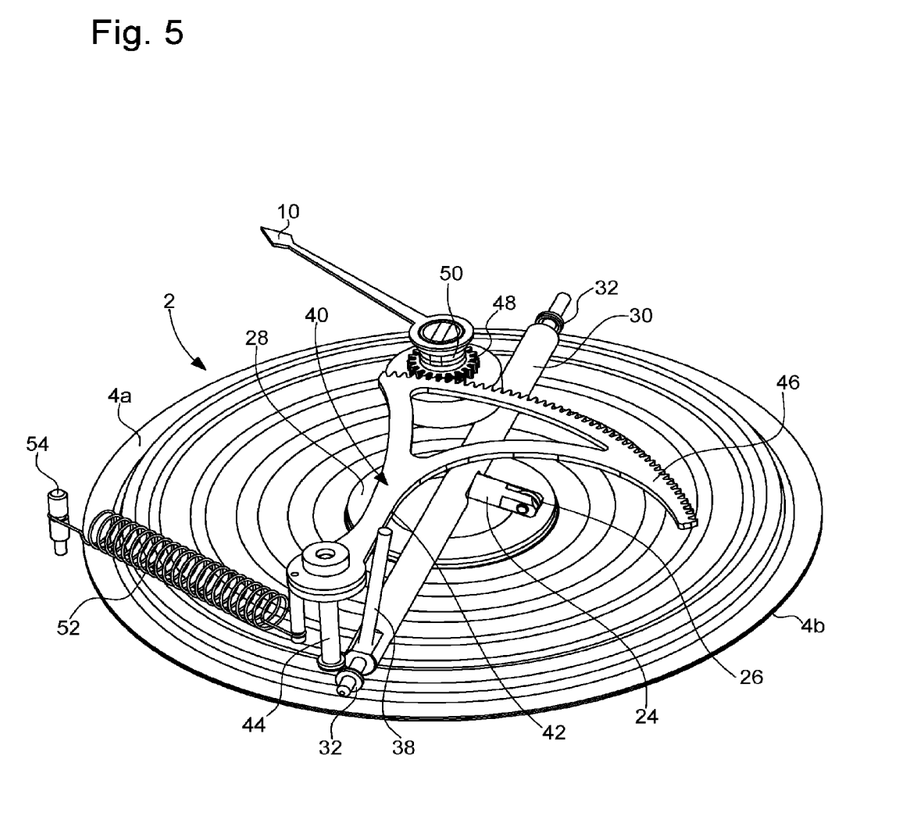
FIG. 5 is a perspective view of the altitude measurement device compressed by a helical spring so as to maintain the sensing element in permanent contact with the atmospheric pressure sensor.
Figure 6:
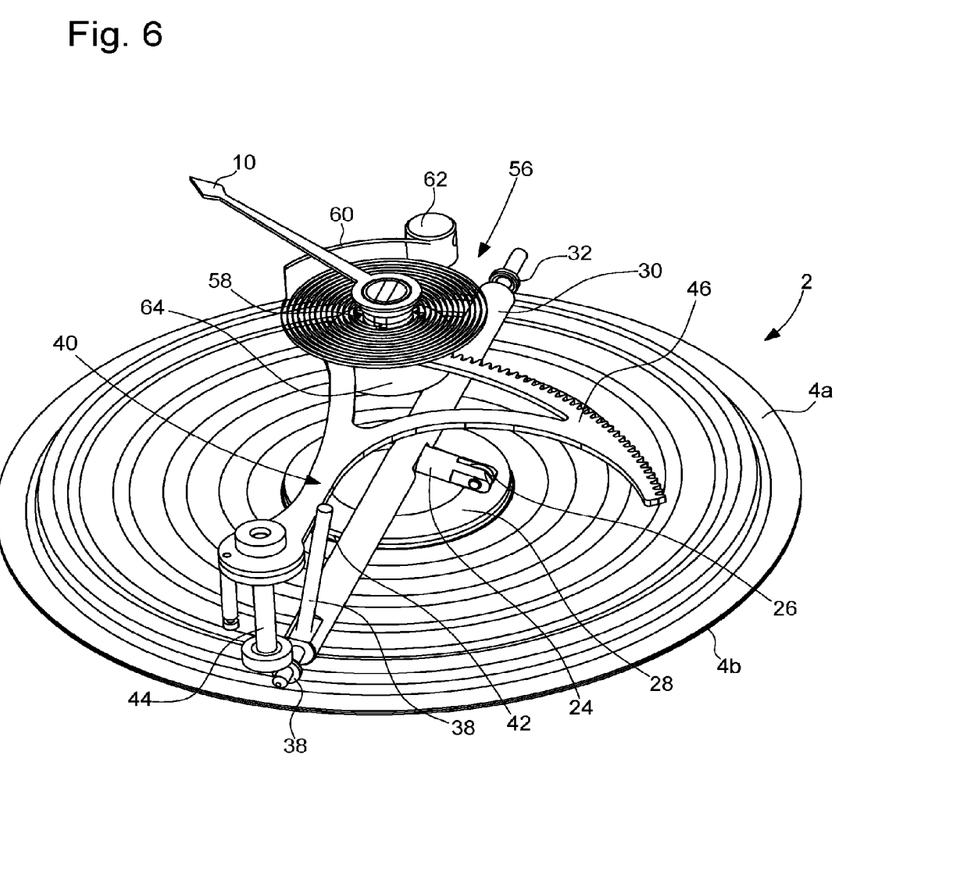
FIG. 6 is a perspective view of the altitude measurement device compressed by a spiral spring so as to maintain the sensing element in permanent contact with the atmospheric pressure sensor.

These elastic means, namely helical spring 52 or spiral spring 56, can maintain sensing element 22 in contact with atmospheric pressure sensor 2 and compensate for any play between the toothing of toothed sector 46 of rack 40 and the toothing of pinion 48.

Figure 4:
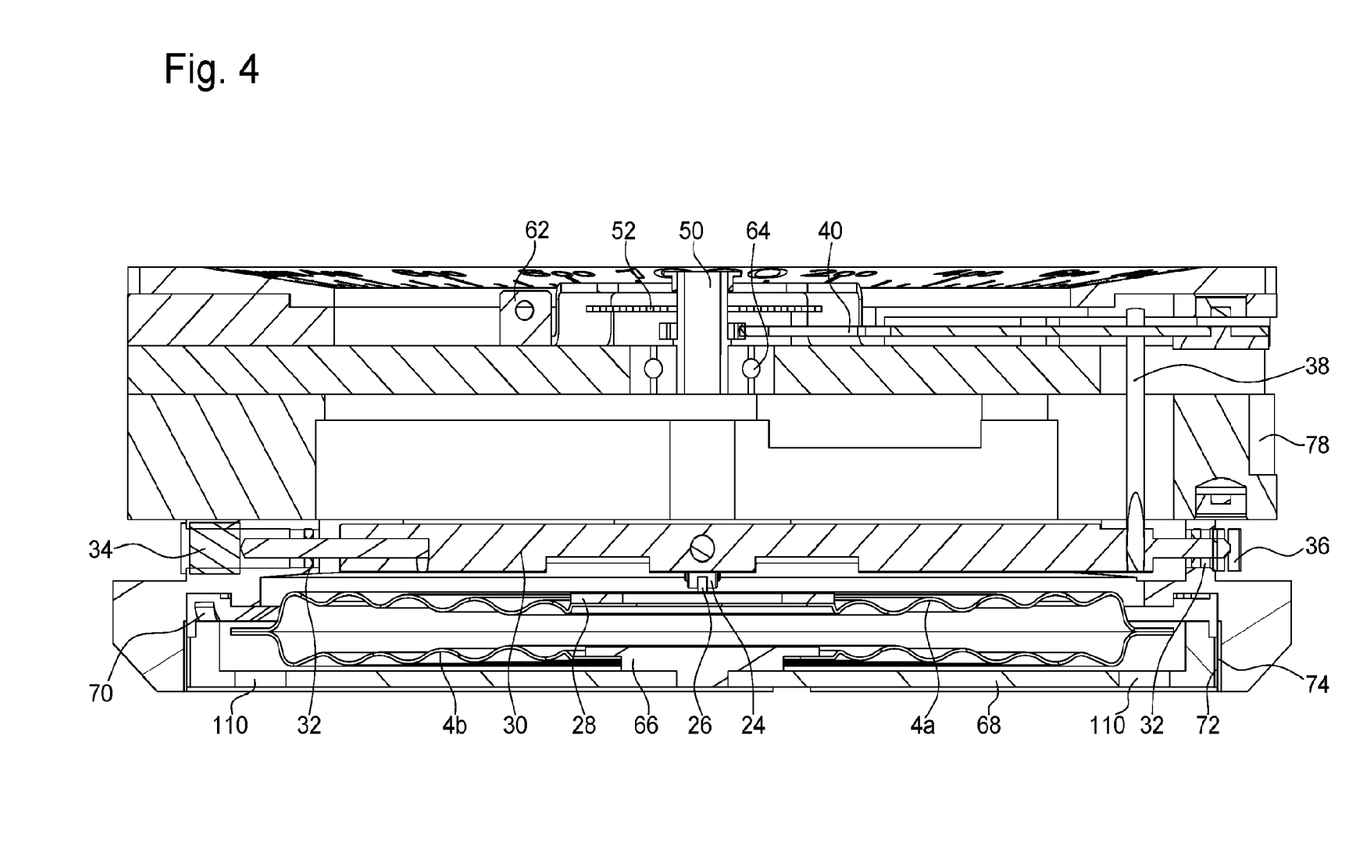
FIG. 4 is a cross-sectional view along the 12 o'clock-6 o'clock axis of the wristwatch case and inside which is housed the altitude measurement device.
Figure 7:
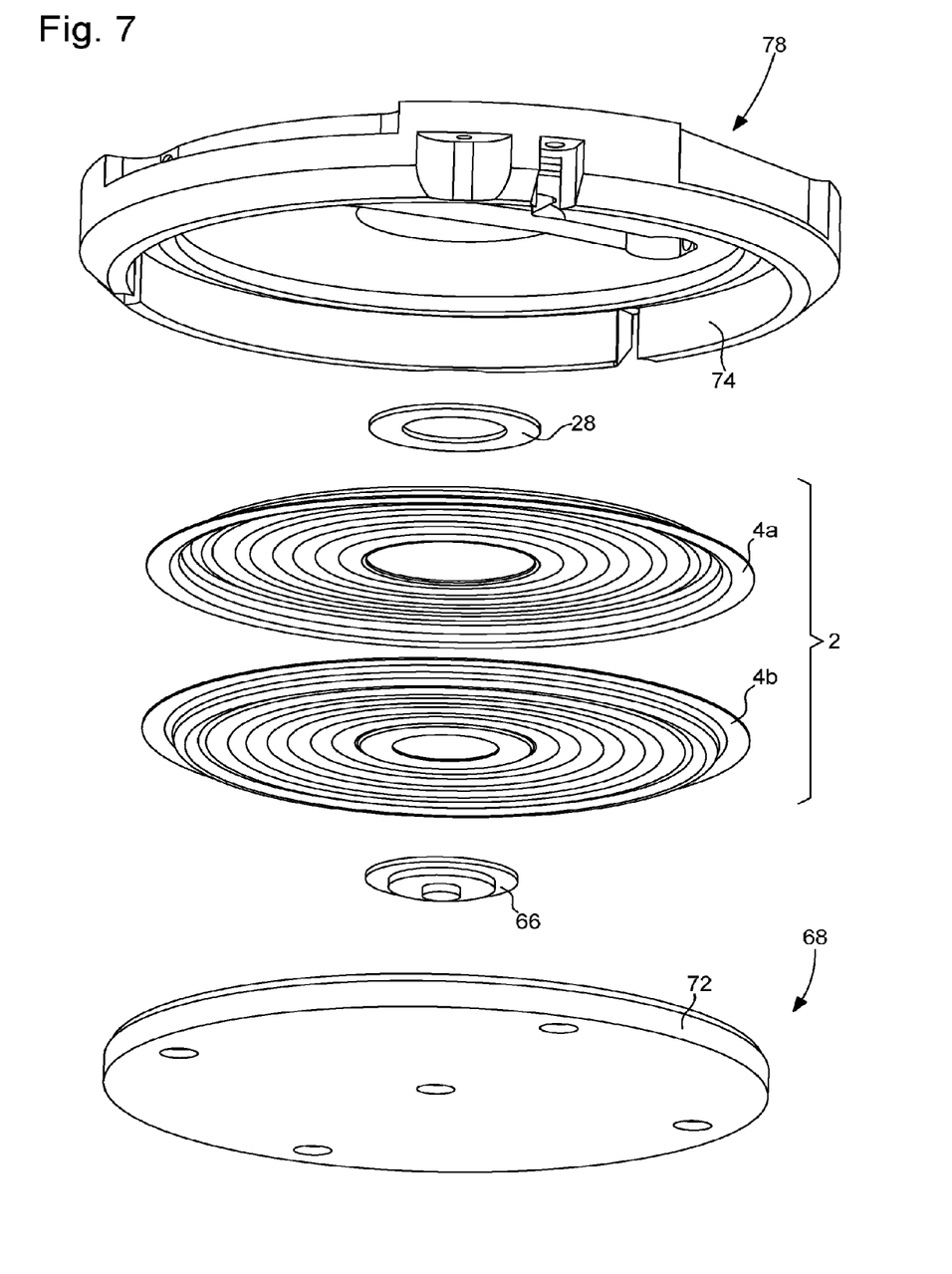
FIG. 7 is a perspective view of the case of FIG. 3 inside which the altitude measurement device is placed for calibration.

According to yet another feature (FIG. 7), atmospheric pressure sensor 2 is mounted on a seat 66 which is, for example, pressed and bonded in a support 68 with the insertion of a flange 70 to take up play between atmospheric pressure sensor 2 and support 68 (FIGS. 3 and 4). This support 68 is provided on the outer periphery thereof with a first thread 72 which cooperates with a second thread 74 provided on the inner periphery of a cover 78 which, with support 68, forms a casing 80. Support 68 may thus be screwed-in or unscrewed, which makes it possible to precisely adjust the height of atmospheric pressure sensor 2 inside case 16 of watch 18 and thus to compensate for any dimensional variations of atmospheric pressure sensor 2 due to manufacturing tolerances.

Altitude measurement device 1 is placed, for calibration (FIGS. 8 and 9), inside a sealed device 82, for example such as a sealed chamber 84 closed by a glass 86 with the insertion of a sealing gasket 88. This sealed chamber 84 includes an air intake 90 which can adjust the pressure inside chamber 84 as required.

Figure 8:
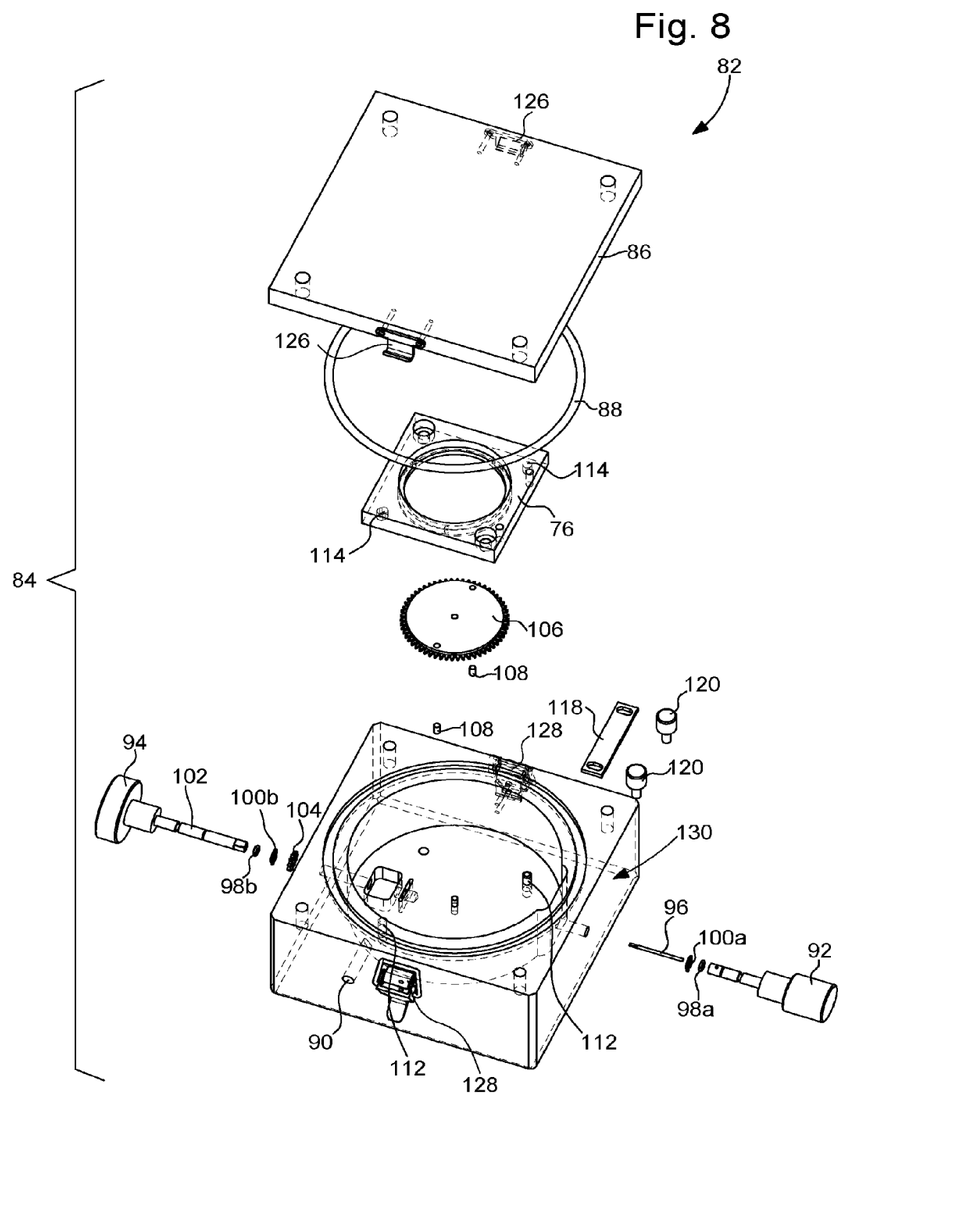
FIG. 8 is an exploded perspective view of the chamber for calibrating the altitude measurement device according to the invention.
Figure 9:
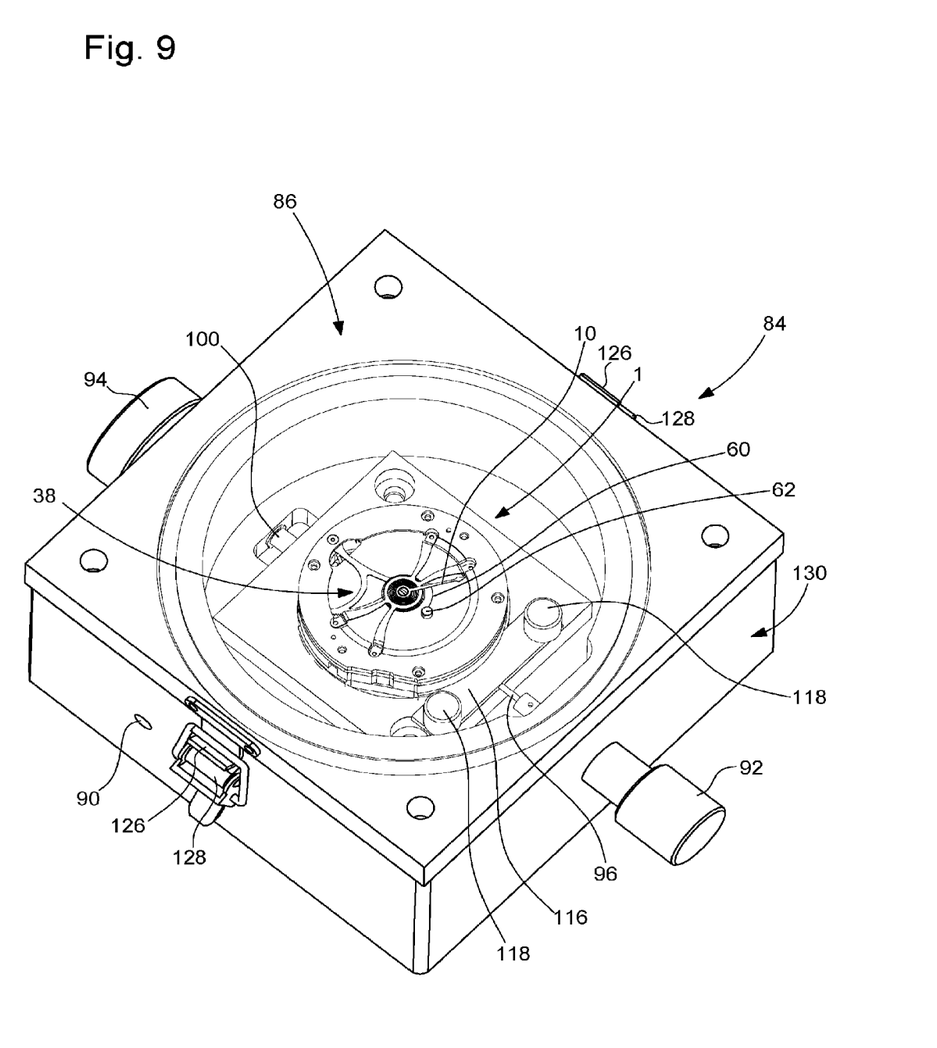
FIG. 9 is a perspective view of the chamber inside which the altitude measurement device according to the invention is placed for calibration.
Figure 10:
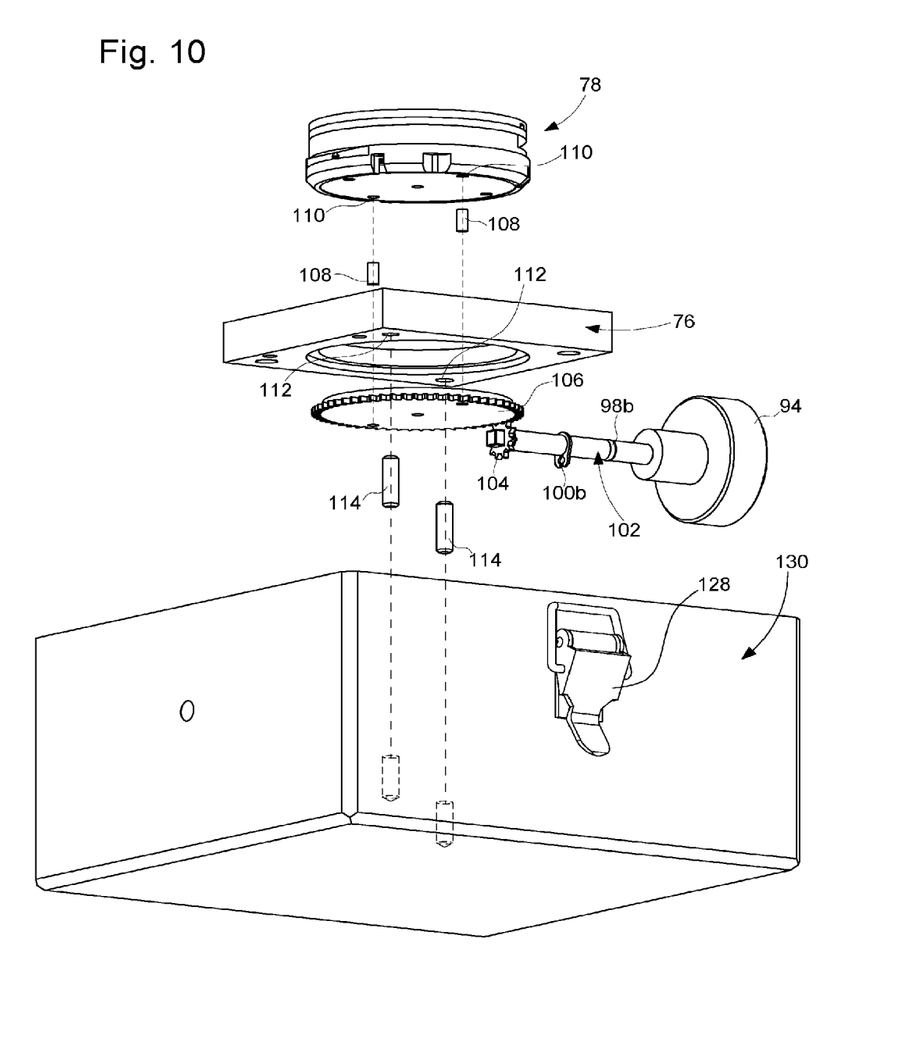
FIG. 10 is an exploded perspective view of the drive system for adjusting the height of the atmospheric pressure sensor.

Sealed chamber 84 also includes first and second buttons 92 and 94 for setting altitude measurement device 1. First button 92 is extended towards the inside of sealed chamber 84 by a screwdriver blade 96, pivoted on a jewel 98a, by means of which adjustment screw 34 can be activated to adjust the axial position of transmission shaft 30. A sealing gasket 100a is disposed on screwdriver blade 96 in order to seal the passage of first button 92. Second button 94 includes a shaft 102 pivoted on a jewel 98b and on which is engaged a sealing gasket 100b in order to seal the passage of second button 94. At its free end, shaft 102 carries a pinion 104 which cooperates with a toothed wheel 106 which extends horizontally (FIG. 10). The plate of this toothed wheel 106 carries two pins 108 disposed diametrically opposite each other and which are received in two corresponding holes 110 provided in support 68. By turning second button 94 in one direction or the other, it is thus possible to screw-in or unscrew support 68 and thus to move atmospheric pressure sensor 2 up or down.

Figure 11:
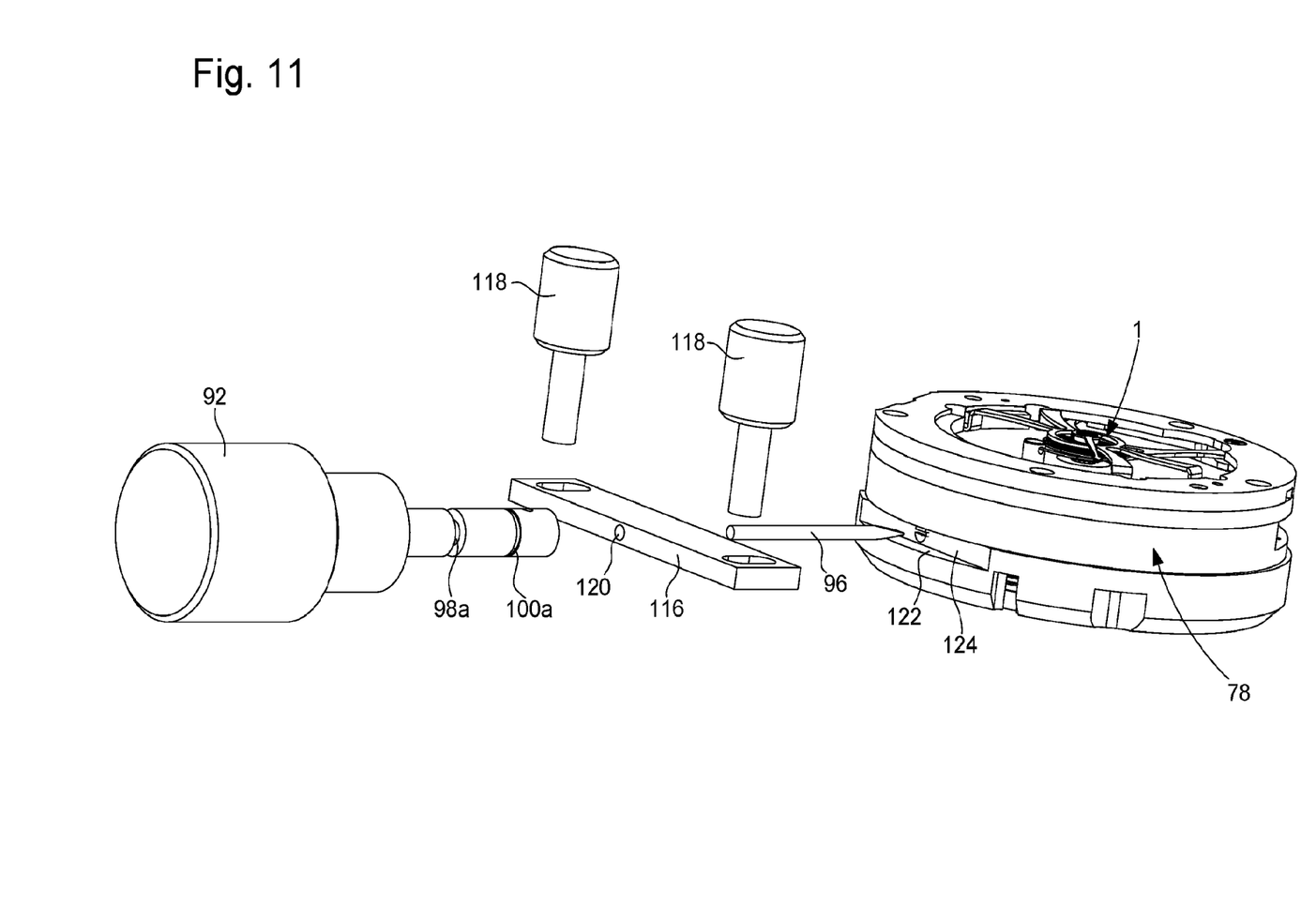
FIG. 11 is a partial perspective view of the system for immobilising the altitude measurement device of the invention inside the sealed chamber.

More specifically and as illustrated in FIG. 10, altitude measurement device 1 is received inside sealed chamber 84 by a jig 76 provided with two holes 112 in which engage two pins 114 that protrude into the bottom of chamber 84. A holding blade 116 retained by two screws 118 (FIG. 11), is also provided. This holding blade 116 is pierced with a hole 120 through which screwdriver blade 96 passes and bears on a flat shoulder 122 arranged in cover 78 and delimited by a flat rectilinear wall 124 against which holding blade 116 bears. Consequently, cover 78 is axially and pivotally locked inside chamber 84, which means that support 68 can be screwed-in or unscrewed as required, and thus atmospheric pressure sensor 2 can be moved up or down relative to the other components of altitude measurement device 1 during operations to calibrate the latter. For the sealed closing of chamber 84, glass 86 is provided with two hooks 126 which cooperate with two bolts 128 fixed to frame 130 of chamber 84.

Calibration of altitude measurement device 1 is performed in the following manner.

Firstly, altitude measurement device 1 according to the invention is inserted in chamber 84. Altitude measurement device 1 is immobilised inside chamber 84 by means of holding blade 116 which is locked by tightening screws 118. Beforehand, it is ensured that pins 108 are properly inserted in the corresponding holes 110 provided in support 68. To do this, it is sufficient simply to rotate toothed wheel 106 until pins 108 penetrate holes 110. Chamber 84 is closed in a sealed manner by means of bolts 128 which engage with hooks 126. It is ensured that sealing gasket 88 is properly in place.

Then, the atmospheric pressure inside chamber 84 is brought to a value of 1013.25 hPa, which corresponds to the mean atmospheric pressure prevailing at sea level at 0 m altitude, and the position of rectilinear segment of contact points 42 is observed with respect to transmission shaft 30. If necessary, second button 94 is rotated in one direction or the other, so as to screw in or unscrew support 64 and thus to move atmospheric pressure sensor 2 up or down. The translational motion of atmospheric pressure sensor 2 is communicated to rack 40 via sensing element 22 and transmission pin 38. Altitude measurement device 1 is properly set at sea level altitude when rectilinear contact point segment 42 extends parallel to transmission shaft 30.

Finally, the atmospheric pressure inside chamber 84 is reduced to a value corresponding, for example, to an altitude of 4000 meters. If indicator hand 10 is not pointing to graduation 4000 on circular scale 12 marked on flange 14, transmission shaft 30 is moved axially by screwing-in or unscrewing adjustment screw 34 via first button 92.

When the two operations described above have been performed, the calibration of altitude measurement device 1 is complete. In order to check, one need only, for example, increase the atmospheric pressure inside chamber 84 again to a value corresponding to sea level and it will be observed that indicator hand 10 points to the graduation 0 on circular scale 12.

It goes without saying that this invention is not limited to the embodiment that has just been described and that various simple modifications and variants can be envisaged by those skilled in the art without departing from the scope of the invention as defined by the annexed claims. It will be understood, in particular, that the operations to calibrate altitude measurement device 1 may easily be automated. Indeed, this requires simply providing a camera capable of locating the position of rectilinear contact point segment 42 with respect to transmission shaft 30 and of locating the position of indicator hand 10 with respect to circular scale 12 marked on flange 14. The camera will be supplemented by a device for activating buttons 92, 94. It will also be understood that these calibration operations are performed in the factory and that the altitude measurement device is set perfectly when delivered to its user. If, during a trip, the user observes that the altitude indicated by his altitude measurement device does not correspond to the altitude of the place where he is situated, he can simply rotate the flange to move the indication on circular scale 12 for the altitude at which he is situated opposite indicator hand 10. It is also noted that the calibration operations are performed at ambient temperature, typically 23° C. Once altitude measurement device 1 has been properly calibrated, it is possible to clamp together the threads of support 68 and of cover 78 and adjustment screw 34, for example, with the aid of wax or adhesive bonding to prevent altitude measurement device 1 from being thrown out of adjustment.

LIST OF PARTS

Altitude measurement device 1
Atmospheric pressure sensor 2
Upper plate 4a and lower plate 4b
Transmission system 6
Activation system 8
Indicator hand 10
Circular scale 12
Flange 14
Case 16
Wristwatch 18
Rotating bezel 20
Sensing element 22
Arm 24
Caster 26
Washer 28
Transmission shaft 30
Jewels 32
Adjustment screw 34
Resilient strip 36
Transmission pin 38
Rack 40
Rectilinear segment of contact points 42
Vertical pivot shaft 44
Toothed sector 46
Pinion 48
Tube 50
Helical spring 52
Stud 54
Spiral spring 56
Inner curve 58
Outer curve 60
Stud 62
Ball bearing 64
Dial 65
Seat 66
Support 68
Play take-up flange 70
First thread 72
Second thread 74
Jig 76
Cover 78
Casing 80
Sealed calibration device 82
Chamber 84
Glass 86
Sealing gasket 88
Air intake 90
First button 92
Second button 94
Screwdriver blade 96
Jewels 98a, 98b
Sealing gaskets 100a, 100b
Shaft 102
Pinion 104
Toothed wheel 106
Pins 108
Holes 110
Holes 112
Pins 114
Holding blade 116
Screws 118
Hole 120
Flat shoulder 122
Flat rectilinear wall 124
Hooks 126
Bolts 128
Frame 130

What is claimed is:

1. A sealed device for calibrating an altitude measurement device that includes an atmospheric pressure sensor arranged to be compressed or to expand in a rectilinear direction as a function of the atmospheric pressure to be measured which increases or decreases, wherein the movements of deformation of the atmospheric pressure sensor are converted, via a transmission system, into a pivoting motion, in a plane perpendicular to the rectilinear direction of deformation of the atmospheric pressure sensor, of an activation system that drives the pivoting of an indicator hand, wherein the indicator hand moves opposite a graduated circular scale, wherein the atmospheric pressure sensor is mounted on a support provided on the external periphery thereof with a first thread that cooperates with a second thread provided on the inner periphery of a cover, wherein the transmission system includes a sensing element formed of an arm, via a free end of which the sensing element bears on the atmospheric pressure sensor, wherein the sensing element is rigidly fixed to a transmission shaft that extends in a perpendicular direction to the rectilinear direction of deformation of the atmospheric pressure sensor, wherein the transmission shaft is movably mounted along the longitudinal axis of symmetry thereof between an adjustment screw and a resilient strip, wherein the sealed calibration device comprises an air intake which can adjust the pressure inside the calibration device as required, and also first and second buttons for setting the altitude measurement device, wherein the first button is extended towards the inside of the calibration device by a screwdriver blade by means of which the adjustment screw can be activated to adjust the axial position of the transmission shaft, and wherein the second button comprises a shaft that carries at the free end thereof a pinion that cooperates with a toothed wheel that extends horizontally and whose plate carries two pins that are received in two corresponding holes provided in the support, so that by activating the second button in one direction or the other, it is possible to screw-in or unscrew the support and to move the atmospheric pressure sensor up or down.

2. The sealed calibration device according to claim 1, wherein a first sealing gasket is engaged on the screwdriver blade to seal the passage of the first button, and wherein a second sealing gasket is engaged on the shaft to seal the passage of the second button.

3. The sealed calibration device according to claim 1, wherein it is a chamber.

4. The sealed calibration device according to claim 2, wherein it is a chamber.

5. The scaled calibration device according to claim 3, wherein the chamber is closed by a glass with the insertion of a sealing gasket.

6. The sealed calibration device according to claim 4, wherein the chamber is closed by a glass with the insertion of a sealing gasket.

7. A Method for calibrating an altitude measurement device including an atmospheric pressure sensor arranged to be compressed or to expand in a rectilinear direction as a function of the atmospheric pressure to be measured which increases or decreases, wherein the movements of deformation of the atmospheric pressure sensor are converted, via a transmission system, into a pivoting motion, in a plane perpendicular to the rectilinear direction of deformation of the atmospheric pressure sensor, of an activation system that drives the pivoting of an indicator hand, wherein the indicator hand moves opposite a graduated circular scale, wherein the atmospheric pressure sensor is mounted on a support provided on the external periphery thereof with a first thread that cooperates with a second thread provided on the inner periphery of a cover, wherein the transmission system includes a sensing element formed of an arm, via a free end of which the sensing element bears on the atmospheric pressure sensor, wherein the sensing element is rigidly fixed to a transmission shaft that extends in a perpendicular direction to the rectilinear direction of deformation of the atmospheric pressure sensor, wherein the transmission shaft is movably mounted along the longitudinal axis of symmetry thereof between an adjustment screw and a resilient strip, wherein a transmission pin is rigidly fixed to the transmission shaft that cooperates with the activation system in a rectilinear segment of contact points to communicate to said activation system the movements of deformation of the atmospheric pressure sensor, wherein the calibration method includes the steps of placing the altitude measurement system under an atmospheric pressure of 1013.25 hPa, and acting on the transmission system to place the rectilinear segment of contact points parallel to the transmission shaft, then reducing the atmospheric pressure to a selected value corresponding to a determined altitude, and adjusting the position of the atmospheric pressure sensor to place the indicator hand opposite the altitude value on the graduated circular scale that corresponds to the selected atmospheric pressure value.

\* \* \* \* \*

UNITED STATES PATENT AND TRADEMARK OFFICE
CERTIFICATE OF CORRECTION

PATENT NO. : 9,995,592 B2
APPLICATION NO. : 15/197915
DATED : June 12, 2018
INVENTOR(S) : Yvan Ferri et al.

Page 1 of 1

It is certified that error appears in the above-identified patent and that said Letters Patent is hereby corrected as shown below:

In the Specification

In Column 3, Line 67, change "invention;" to --invention.--.

In the Claims

In Column 9, Line 31, Claim 5 change "scaled" to --sealed--;
    Line 37, Claim 7 change "Method" to --method--.

Signed and Sealed this
Eighteenth Day of June, 2019

Andrei Iancu
*Director of the United States Patent and Trademark Office*